Jan. 17, 1961 D. E. LUPFER ET AL 2,968,308
CONTINUOUS ANALYSIS OF PROCESS STREAMS
Filed March 28, 1957
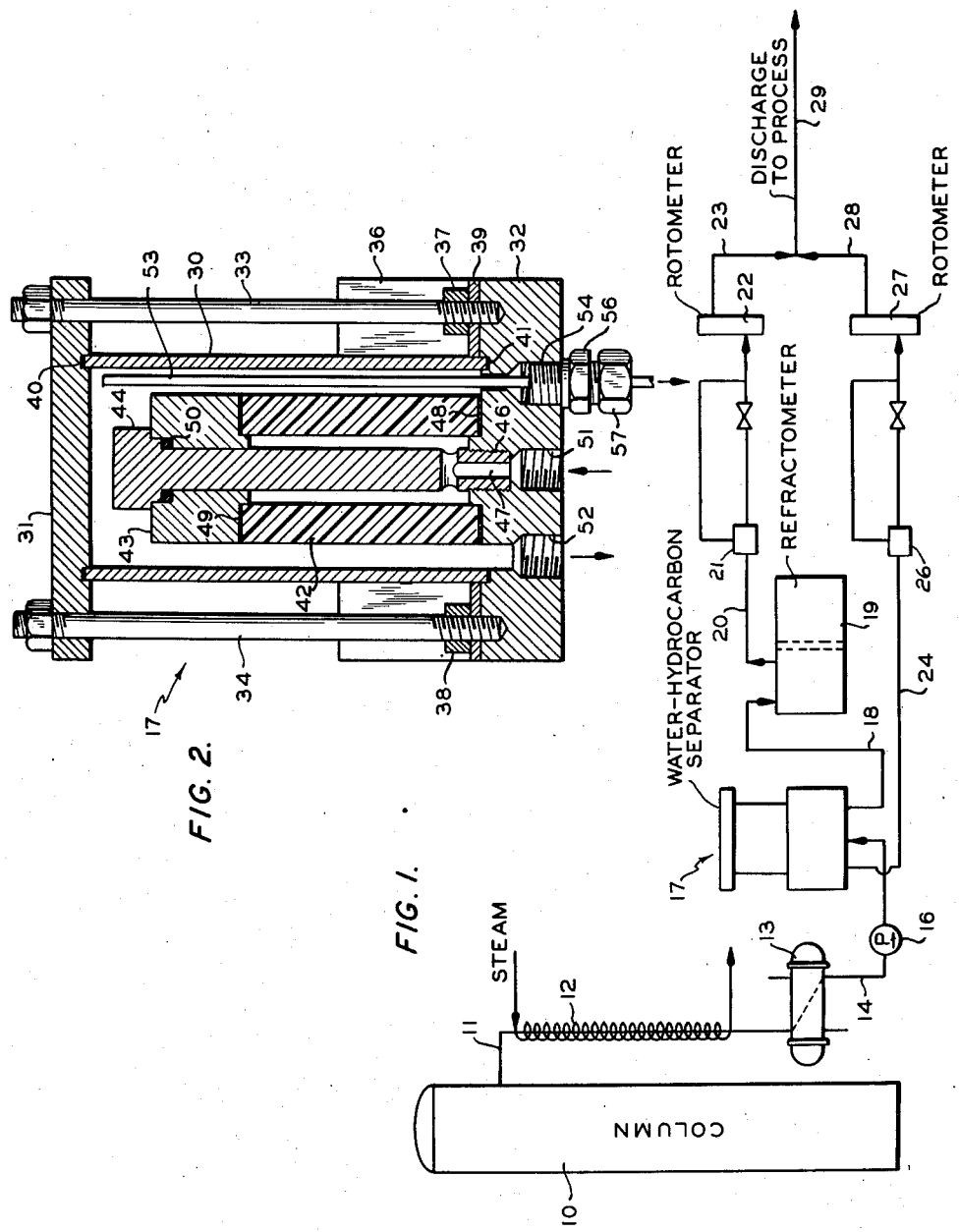
INVENTORS
D. E. LUPFER
R. D. COUGHENOUR
BY
ATTORNEYS United States Patent Office 2,968,308
Patented Jan. 17, 1961

2,968,308
CONTINUOUS ANALYSIS OF PROCESS STREAMS

Dale E. Lupfer and Robert D. Coughenour, Bartlesville, Okla., assignors to Phillips Petroleum Company, a corporation of Delaware Filed Mar. 28, 1957, Ser. No. 649,100

8 Claims. (Cl. 137—1)

This invention relates to an apparatus and method for continuously analyzing one component of a process dispersion. In other aspects this invention relates to a method and apparatus for continuously sampling a dispersion, separating one component therefrom and analyzing said component. In one of its more specific aspects this invention relates to a system for continuously sampling a water-in-hydrocarbon dispersion analyzing the hydrocarbon void of free water.

Continuous analysis systems which are used for process control are only as successful as the sampling techniques employed. It is imperative for the successfull operation of continuous analytical control instruments that uniform and representative samples be obtained and supplied to the instrument. Also, it is necessary that a uniform sample delay time be maintained, i.e., that there be a constant time interval for the sample to travel between the sampling point and the point of analysis. Steady operation of such an automatic process depends upon the accuracy with which the analysis results can be related to specific operational variables prevailing at the instant the sample was taken.

In certain continuous analytical-control operations, the process stream sampled comprises a mixture of components, not all of which are desirable in the specimen fed to the analytical cell of the control instrument. For example, small but variable amounts of water are frequently present in hydrocarbon process streams and normally an attempt is made to remove the water, such as by passing the sample stream through a float operated trap, prior to analysis. Since the water is generally well dispersed and to some extent emulsified in the hydrocarbon, efficient and dependable separation is quite difficult.

According to this invention an improved analysis system is provided which enables consistent and representative samples to be supplied to an analytical instrument, even when the component to be analyzed exists in a dispersion with other components in the process stream from which the sample is obtained. This improved analysis system comprises a dispersion separator in combination with an analytical instrument, said dispersion separator having as its principal functional element an inert permeable medium which serves to coalesce the dispersed phase of said dispersion as the sample is passed therethrough. With this system, dispersions such as emulsions, mists, or even certain gaseous mixtures are passed continuously through the separator where the dispersed component is coalesced and phase separation occurs. Either phase thus provided can be passed continuously to the analytical instrument, thus providing a uniform sample for analysis. In a preferred embodiment of our invention, flow control means are provided to regulate the rate at which the total flow of material leaves the separator as well as the flow rate through the analyzer. By such flow control means a uniform delay time can be assured for the sample stream. In instances when vapor process streams are sampled a further improvement in delay time stabilization is provided by heating the sample line to maintain the sample stream in the vapor state while it is being carried to the point of analysis and then condensing the sample stream at one point immediately prior to passing it to the separator. Our invention embraces the improved method of obtaining and preparing a sample for continuous analysis by a control instrument as well as the apparatus with which this can be accomplished.

It is an object of this invention to provide an analysis system which is capable of continuously separating one component from a dispersion and analyzing said component. It is another object of this invention to provide an analysis system for handling samples of dispersions with a uniform sample delay time. It is another object to provide a system for sampling and analyzing a vaporous process stream with a uniform sample delay time. Still another object is to provide a method by which dispersions having two components can be continuously sampled and analyzed. Other objects of this invention are to provide a method and an apparatus for continuously sampling a water-contaminated hydrocarbon stream, obtining therefrom hydrocarbon void of free-water and analyzing the hydrocarbon. Other objects, advantages and features of this invention will be apparent to those skilled in the art from the following description and drawings in which:

Figure 1 is a schematic flow diagram of one embodiment of our invention adapted to sample a hydrocarbon vapor stream and analyze the hydrocarbon after removal of water therefrom; and Figure 2 is a sectional view of the continuous water-hydrocarbon separator.

The analysis system of our invention employs an improved means of separating two fluid components from a dispersed state when these components are capable of phase separation. The use of this method of dispersion separation is particularly valuable in continuous analysis systems because the separation effected is uniform and the method does not vary the delay time of the sample as it is fed to the analytical instrument. This separation is effected by passing the dispersion through an inert, permeable medium which is capable of coalescing the dispersed component so that phase separation can readily occur. Such a coalescing medium is a solid, porous mass which is inert and insoluble in the materials of the dispersion but sufficiently permeable to allow passage of these materials therethrough. The pore size should be in the range of about 5 to 50 microns and the permeability in the range of about 10,000 to 50,000 millidarcys. When passing dispersions through mediums of this type the dispersed particles tend to coalesce and separate from the continuous phase on the downstream side of the coalesing medium.

Particularly suitable for dispersion separations and preferred for use in our continuous analysis system is a permeable plastic material which has been developed and is now commercially available from Petroleum Engineering and Tool Company of Houston, Texas. This permeable plastic medium is composed of a phenolic resin and has throughout its mass a myriad of small pores which are interconnected to provide a high and variable permeability. This permeable plastic is available in cylindrical or tubular elements which are capable of breaking emulsions by coalescing or gathering molecules of similar liquids to form droplets that settle out of the continuous phase due to differences in density. This medium can also effect mist extraction, thus removing fine liquid particles from a gaseous stream. It is even possible to separate a mixture of gases by concentrating the heavier gas to its saturation point so that it condenses and separates as droplets from the remainder of the gaseous stream.

The component to be analyzed can be either the dispersed component or the component in the continuous phase, or in the case of gaseous dispersions, either the lighter or heavier gas. Generally, however, the dispersed component or the heavier gas is present in relatively small amounts and the purpose of the separation is to obtain a specimen of major component substantially free of the dispersed component, other than that present in dissolved form. The operating principle of the coalescing medium is to provide more resistance to passage to the dispersed phase than to the continuous phase so that loci of high concentrations of dispersed phase develop, eventually coalescing the dispersed fluid into droplets of sufficient size to separate by gravity from the continuous phase. When separating a dispersion of a liquid in a liquid, it is necessary first to wet the permeable medium with the liquid in continuous phase. Two immiscible fluids of different surface tension cannot take possession of a surface at the same time. When an emulsion of two immiscible fluids is passed through a permeable barrier, the fluid in possession of the surface of the barrier will traverse it with ease, while the other fluid will tend to be repelled and concentrated. In extraction of mists the operating principle is somewhat different, the liquid droplets tending to collect and coalesce on the surface of the medium while the gas travels the tortuous paths provided by the interconnected openings. In gas separation, use is made of the relative velocities of gas molecules to concentrate and condense the heavier gas within the small channels of the permeable plastic medium.

This permeable plastic is particularly valuable in the separation of water-in-hydrocarbon emulsions since the phenolic resin lends itself to permeanent hydrocarbon wetting, thus increasing the effectiveness of the separation of water from the hydrocarbon. We have found that, surprisingly, a water-hydrocarbon emulsion can be separated by passage through such a permeable plastic element with the resulting hydrocarbon phase not only void of free-water but actually containing less than the saturation amount of dissolved water. Thus, this type of permeable plastic can be most advantageously employed in continuous analysis systems for separating one component to be analyzed from its state in a dispersion in the sample removed from the process stream.

It should be understood that a number of different analitical instrument can be advantageously employed in the analysis system of our invention. The use of a differential refractometer adapted to continuously analyze a hydrocarbon stream is especially suitable; however, several other types of instruments can be readily employed, for example, an infrared analyzer, a mass spectrometer, a colormonitor, or the like. Other instruments which are particularly suitable are those adapted to measure dielectric properties. Broadly, the analytical system of our invention can be used in any process, preferably a hydrocarbon process, where it is desired to sample and analyze a process stream or a component therein.

Referring now to the drawing, Figure 1 shows a schematic diagram of our invention as used, for example, in the continuous analysis and control of a gas concentration unit, such as a deisopentanizer. In this case a vapor sample is withdrawn from column 10 and passed through sample line 11 to a remote point at which the analytical apparatus is located. Throughout its length, which in such an application may be as much as 40 feet or more, sample line 11 is heated by steam tracing 12 in order to maintain the sample in the vapor state. Any other suitable heating means, such as electrical resistance coils, could be used; but steam is preferred for economy. At the point of analysis the vapor sample is condensed in condenser 13 and passed to the analytical apparatus through line 14 by pump 16. A pump is used when the discharged pressure is higher than the pressure at the sample point.

Since the analytical instrument is being used for automatic control of the process, it is important that the sample delay time be constant. If sample line 11 is not heated, the sample will tend to condense in the line, and changes in ambient temperature would cause variations in liquid level which, in turn, causes the sample delay time to change. Maintaining the sample in the vapor phase throughout the length of line 11 eliminates this problem.

The sample as it is withdrawn by pump 16 contains a certain amount of free-water dispersed in the hydrocarbon phase. The amount of water tends to vary from time to time and if not removed from the hydrocarbon prior to analysis, will effect the results obtained and cause erroneous automatic adjustment of the process variables. It is, therefore, necessary to quickly and steadily remove the free-water from the hydrocarbon prior to passing the hydrocarbon to the analytical instrument. This is accomplished in our invention by separator 17 which employs the permeable plastic element above described. The operation of this separator will be describ d in greater detail in connection with Figure 2. A separation is effected resulting in two streams continuously flowing from separator 17. Hydrocarbon which is void of free-water passes through line 18 to differential refractometer 19 wherein the hydrocarbon is analyzed for the presence of one of its components, in this case pentanes in isopentane. The hydrocarbon stream leaves the differential refractometer through line 20 in which the flow is controlled by differential pressure flow controller 21. Generally the instrument itself is provided with such flow control means. The flow controller is normally positioned downstream from the instrument but can be located between the instrument and the separator. A visual flow indication is provided by rotometer 22 and the hydrocarbon stream passes through line 23 to line 29 where it is returned to the process at some point of lower pressure. The refractometer is by-passed by the major portion of the sample stream. This portion, which contains substantially all of the free-water coalesced in separator 17, passes through line 24 in which the flow is controlled by differential pressure flow controller 26, through rotometer 27 and line 28 to be combined with the hydrocarbon stream from the refractometer in line 29 and returned to the process. Differential pressure flow controllers 21 and 26 control the total flow from the separator 17 as well as the flow through refractometer 19; thus a constant delay time is provided for the sample fed to refractometer 19.

Referring to Figure 2, a suitable arrangement for separator 17 is shown in cross section. The phase separation zone is formed by cylindrical barrel 30 capped by head member 31 and base member 32 to form a closed chamber. Bolts 33 and 34 passing through head member 31 and imbedded in base member 32 secure barrel 30 in position. Wall bracket 36 is held in position by nuts 37 and 38 bearing upon arm 39 of bracket 36. Gaskets 40 and 41 provide a tight seal between barrel 30 and head and base members 31 and 32 respectively.

Concentrically positioned within barrel 30, a hollow cylindrical element 42 of permeable plastic is provided. Element 42 is held in position by volume reducing plug 43 and retaining bolt 44 which has a threaded base 46 and T-shaped port 47 providing entrance into the annular space between element 42 and bolt 44. Gaskets 48 and 49 provide a tight seal for the permeable plastic element 42 between plug 43 and base member 32. O-ring 50 likewise provides the seal between retaining bolt 44 and reducing plug 43.

Threaded inlet 51 is provided in base member 32 in alignment with port 47 of retaining bolt 44. Thus, dispersion sample enters the separator through ports 51 and 47 filling the annular space defined by element 42 and bolt 44. As the sample of hydrocarbon-water dispersion is forced through the permeable plastic element 42, the tiny water particles are coalesced to form a single phase which readily separates by gravity from the hydrocarbon phase in the separation zone bound by cylindrical member 30.

Hydrocarbon having substantially no free water dispersed therein rises to the top of the chamber and is withdrawn through eduction tube 53. The remainder of the hydrocarbon and all of the water which has been separated by passage through element 42 is withdrawn through outlet 52 at the lower portion of the chamber. Eduction tube 53 passes from the separator through outlet 54 and is held in position by plug 56 and lock nut 57. Hydrocarbon thus separated is passed to the analytical instrument while the hydrocarbon-water mixture withdrawn from outlet 52 by-passes the analytical instrument, as described in connection with Figure 1.

The refractometer shown in Figure 1 can be any of several types of differential refractometers, such as that described in the patent to F. W. Crawford, U.S. 2,724,304, issued November 22, 1955. In place of the differential refractometer other continuous analytical instruments can readily be substituted, depending upon the particular application for which the sampling and analysis system is to be used. For example, an infrared analyzer such as that described in the patent to J. W. Hutchins, U.S. 2,579,825, issued December 25, 1951, may be used. For applications in which an infrared analyzer is employed in the analysis of a gas stream, the gas stream can be provided by vaporizing the liquid sample from the separator or a vapor stream can be employed throughout the system. In that case the separator serves to extract entrained or dispersed liquid from the gas to be analyzed or, by atmolysis, separate a heavy gas from a lighter one.

Other types of suitable continuous control instruments are those instruments for measuring dielectric properties, such as that described in U.S. 2,623,928, issued December 30, 1952, to F. M. Bower, or an instrument for matching colormetric characteristics, such as opacity, as described in U.S. 2,066,934, issued January 5, 1937 to F. H. Gullicksen.

A number of possible applications of our analysis system can be made, particularly in hydrocarbon processes where it is desired to analyze for a hydrocarbon or a component within a hydrocarbon mixture. An example of such an application is for the final purification in butadiene manufacturing. Another application is in ammonia manufacture for the analysis for hydrocarbon in the synthesis gas, in which case it is desirable to remove moisture from the gaseous stream prior to analysis. The separator described can also be used to dry instrument air.

It will be evident to those skilled in the art from the above description and the examples of several modifications that variations of this invention can be made or followed in the light of the foregoing discussion and disclosure without departing from the spirit or scope thereof.

We claim:

1. An improved system for continuous analysis of a component from a dispersion sample having a first component dispersed in a second component, said first and second components being capable of phase separation comprising, in combination, a phase separation zone; means for conveying dispersion sample to said separation zone; a permeable plastic coalescing element interposed between said means and said zone so that said sample must pass through said element on its way to said separation zone; an outlet in the upper portion of said separation zone for removal of the lighter of said components; an outlet in the lower portion of said separation zone for removal of the heavier component; an analytical control instrument; a first conduit connecting one of said outlets with said control instrument; first means for maintaining a substantially constant rate of flow of component through said first conduit and instrument; a second conduit connected to the other of said outlets and by-passing said instrument; and second means for maintaining a substantially constant rate of flow of material through said second conduit.

2. An improved system for continuous analysis according to claim 1 wherein said permeable plastic element is composed of phenolic resin, has a multitude of interconnected pores having a size in the range of from 5 to 50 microns in diameter, and has a permeability in the range of from 10,000 to 50,000 millidarcys.

3. An improved system for continuously sampling a vapor process stream and analyzing one component thereof, said stream having a first component dispersed in a second component, said components being both immiscible and of different densities thus capable of phase separation comprising, in combination, a sample eduction tube positioned to continuously withdraw a sample of said process stream vapors; means for maintaining said sample in the vapor state while in said eduction tube; means for condensing said sample immediately prior to preparation for analysis; means for conveying said sample thus condensed to a dispersion separator, said separator comprising a phase separation zone, a sample inlet to said zone, a permeable plastic coalescing element interposed between said inlet and said zone so that said sample must pass through said element, an outlet in the upper portion of said zone for removing the light component, and an outlet in the lower portion of said zone for removing the heavier component; an analytical control instrument; means for conveying at least a portion of one of said components from said separator to said instrument; first means for maintaining a substantially constant rate of flow of said component portion through said instrument; and second means for maintaining a substantially constant rate of flow of the balance of said sample from said separator.

4. An improved system for continuously analyzing a hydrocarbon stream withdrawn from a continuous hydrocarbon process wherein free-water is dispersed in said hydrocarbon which comprises, in combination, a phase separation zone, a sample inlet for introducing a sample of water-hydrocarbon dispersion from said process stream, a permeable plastic coalescing element interposed between said inlet and said separation zone so that said sample must pass through said element, said permeable plastic being composed of phenolic resin and having a multitude of interconnected pores of a size in the range of from 5 to 50 microns in diameter and a permeability of from 10,000 to 50,000 millidarcys, an outlet in the upper portion of said separation zone for removing hydrocarbon void of free-water, an outlet in the lower portion of said separation zone for removing hydrocarbon and water, a differential refractometer, means for conveying hydrocarbon from said upper outlet to said refractometer, first means for maintaining a substantially constant rate of flow of said hydrocarbon through said refractometer, and second means for maintaining a substantially constant rate of flow of hydrocarbon and water from said outlet in the lower portion of said separation zone.

5. In a process control system wherein a hydrocarbon sample is continuously analyzed, in combination: a sample line positioned to continuously receive a vapor sample of hydrocarbon containing a small amount of water from a sample point within the process and convey said sample to near the point of analysis; means for maintaining said sample in the vapor stage within said line; a condenser positioned to receive said vapor sample from said sample line and condense said sample to the liquid state; a water-hydrocarbon separator comprising a sample inlet connected to said condenser, a settling zone, a permeable plastic coalescing element of phenolic resin composition interposed between said inlet and said zone so that said sample must pass through said element, an outlet in the upper portion of said separation zone for withdrawing hydrocarbon having substantially no free-water therein, and an outlet in the lower portion of said separation zone for withdrawing free water and surplus hydrocarbon;

means for conveying liquid sample from said condenser to said separator; a differential refractometer; means for conveying hydrocarbon having substantially no free-water from said separator to said refractometer; a first differential pressure flow controller maintaining a substantially constant rate of flow of hydrocarbon through said refractometer; a by-pass conduit conveying free-water and surplus hydrocarbon mixture from said separator to a discharge point by-passing said refractometer; and a second differential pressure flow controller maintaining a substantially constant rate of flow of water and hydrocarbon mixture from said separator.

6. The method of continuously analyzing a component from a dispersion sample having a first component dispersed in a second component, said first and second components being capable of phase separation which comprises passing said sample through an inert permeable coalescing medium thereby coalescing said first component, separating said first component phase from said second component leaving said second component substantially free of dispersed first component, passing at least a portion of one of said components to an analytical instrument, continuously analyzing said component portion, maintaining a substantially constant rate of flow of the component portion through said analytical instrument, continuously by-passing said analytical instrument with the balance of said components from said separation zone, and maintaining a substantially constant rate of flow of components by-passing said instrument.

7. The method of continuously sampling a process vapor stream having two components immiscible in the liquid state and of different densities and analyzing one of said components without interference from the other which comprises withdrawing a vapor sample from said process stream, conveying said sample to near the point of analysis, maintaining said sample in the vapor state during said conveying step, condensing said sample to the liquid state, passing said sample thus condensed through a permeable coalescing medium thereby coalescing the dispersed component, separating said first and second components by phase separation, withdrawing at least a portion of one of said components thus separated, passing said portion to an analytical instrument, maintaining the rate of flow of said portion through the analytical instrument substantially constant, withdrawing the balance of said components, by-passing said analytical instrument with said balance of said components, and maintaining the rate of flow of said balance of said components substantially constant.

8. The method of continuously sampling and analyzing a hydrocarbon process stream containing a small amount of water in the vapor phase, which comprises withdrawing a vapor sample from said process stream at a sample point, conveying said sample to near a point of analysis remote from said sample point, maintaining said sample in the vapor state during said conveying step, condensing said sample near the point of analysis thus forming a liquid sample of water dispersed in hydrocarbon, passing said sample through a permeable coalescing medium preferentially wetted by hydrocarbon thereby coalescing said water, forming a water phase and a hydrocarbon phase substantially free of dispersed water in a settling zone, withdrawing a portion of said hydrocarbon phase from said settling zone, passing said portion void of free water to a differential refractometer, maintaining the rate of flow of said hydrocarbon portion through said differential refractometer substantially constant, withdrawing said water phase and the balance of said hydrocarbon phase as a mixture from said settling zone, by-passing said refractometer with said mixture, and maintaining the rate of flow of said mixture substantially constant to maintain a constant sample delay time between said sample point and said refractometer.

References Cited in the file of this patent

UNITED STATES PATENTS

| | | |
|---|---|---|
| 1,787,686 | Kerr | Jan. 6, 1931 |
| 2,370,817 | Shanley | Mar. 6, 1945 |
| 2,694,923 | Carpenter | Nov. 23, 1954 |
| 2,781,864 | Jahn | Feb. 19, 1957 |